US009669300B2

(12) United States Patent
Tolk et al.

(10) Patent No.: US 9,669,300 B2
(45) Date of Patent: Jun. 6, 2017

(54) MOTION DETECTION FOR EXISTING PORTABLE DEVICES

(71) Applicant: BallCraft, LLC, Los Angeles, CA (US)

(72) Inventors: Philip Tolk, Los Angeles, CA (US); Daniel Mosquera, Chicago, IL (US); Elizabeth Anne Stallone, Los Angeles, CA (US)

(73) Assignee: Ballcraft, LLC, Los Angeles, CA (US)

( * ) Notice: Subject to any disclaimer, the term of this patent is extended or adjusted under 35 U.S.C. 154(b) by 394 days.

(21) Appl. No.: 14/584,944

(22) Filed: Dec. 29, 2014

(65) Prior Publication Data
US 2015/0182855 A1 Jul. 2, 2015

Related U.S. Application Data

(60) Provisional application No. 61/921,291, filed on Dec. 27, 2013.

(51) Int. Cl.
A63F 13/211 (2014.01)
A63F 13/428 (2014.01)
A63F 13/213 (2014.01)
A63F 13/5255 (2014.01)
A63F 13/92 (2014.01)

(52) U.S. Cl.
CPC .......... A63F 13/211 (2014.09); A63F 13/213 (2014.09); A63F 13/428 (2014.09); A63F 13/5255 (2014.09); A63F 13/92 (2014.09)

(58) Field of Classification Search
USPC .................................................. 463/31, 32
See application file for complete search history.

(56) References Cited

U.S. PATENT DOCUMENTS

2008/0119269 A1\* 5/2008 Nonaka ............... A63F 13/06
463/32
2009/0219224 A1 9/2009 Elg
(Continued)

FOREIGN PATENT DOCUMENTS

WO 2013166251 A1 11/2013

OTHER PUBLICATIONS

PCT/US2015/028493 Notification of Transmittal of International Preliminary Report On patentability, Jul. 29, 2016.
(Continued)

Primary Examiner — Pierre E Elisca
(74) Attorney, Agent, or Firm — Adam K. Sacharoff; Much Shelist

(57) ABSTRACT

Methods and computer programs that allows users to move game objects in a virtual space with movements performed on current and future portable devices. By using existing technologies in such devices, the methods computer movement relative to the devices themselves in order to detect swinging motions, panning motions, moving motions and gesture and then to apply them to game objects and game cameras inside the virtual space. Moving the physical device causes the devices sensors to respond. The methods interpret this data and provide real time updates within a virtual space on the device as well as transmit the updates to another device that is also moving. This enables 2 players to connect to each other and each player is able to move their device and see it reflected within the others virtual space. This eliminates the need of real world references.

8 Claims, 13 Drawing Sheets

(56) References Cited

U.S. PATENT DOCUMENTS

| | | | | |
|---|---|---|---|---|
| 2011/0039618 A1* | 2/2011 | Ichiyanagi | ............ | A63F 13/803 |
| | | | | 3/803 |
| 2013/0324253 A1* | 12/2013 | Hiratake | ............... | G06F 3/0346 |
| | | | | 463/36 |
| 2015/0363996 A1* | 12/2015 | Keilwert | ............. | G07F 17/3211 |
| | | | | 463/31 |
| 2016/0005263 A1* | 1/2016 | Keilwert | ............. | G07F 17/3211 |
| | | | | 463/33 |

OTHER PUBLICATIONS

PCT Written Opinion of the ISA, Oct. 6, 2015 on corresponding PCT Application US2015/028493.

\* cited by examiner

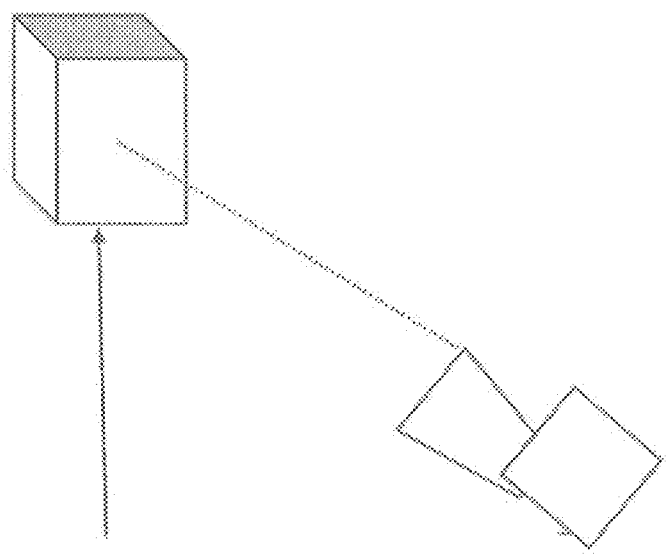
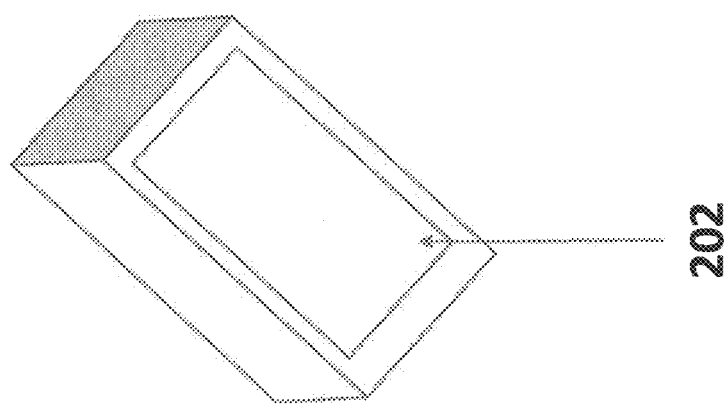
FIG. 2

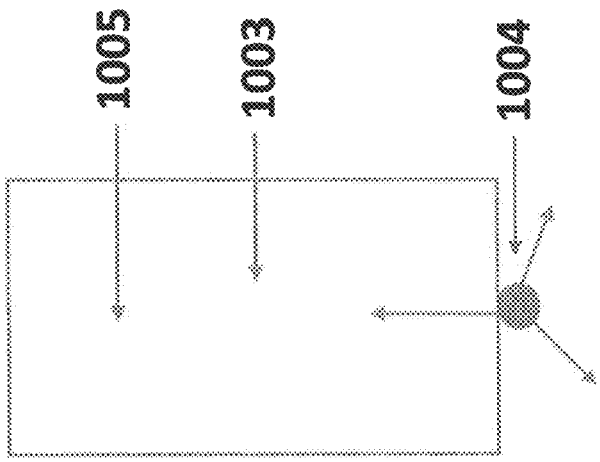
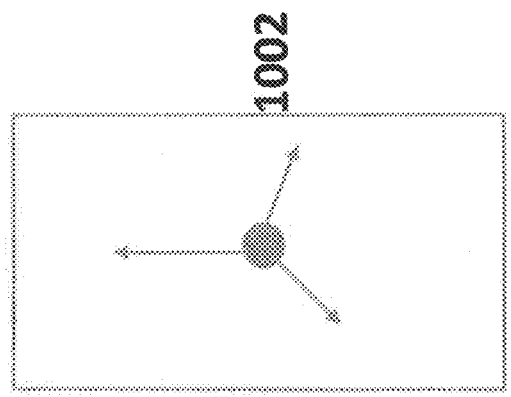
FIG. 10

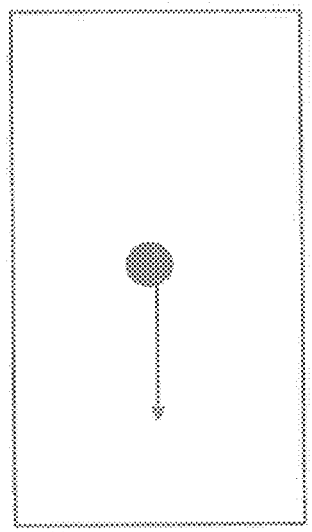
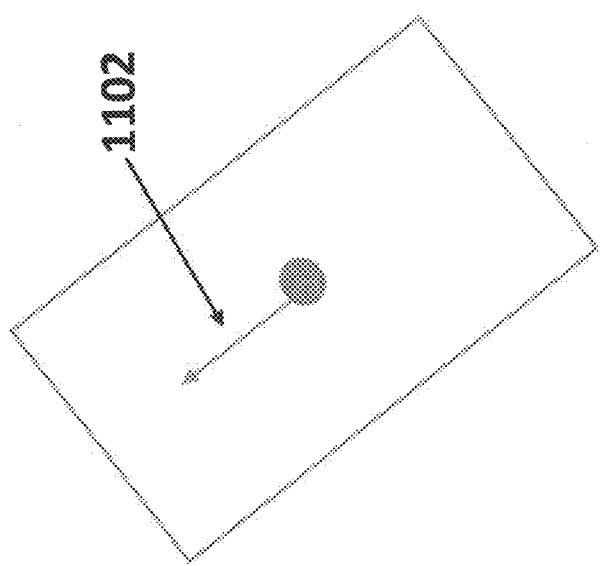
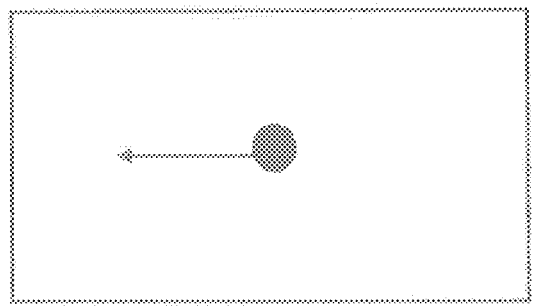
FIG. 11

MOTION DETECTION FOR EXISTING PORTABLE DEVICES

BACKGROUND

Field of the Invention

The present invention relates to methods and computer programs to detect motion of an existing portable device and translate it to gestures to be used in game objects in the virtual space in single and multiplayer sessions.

Description of the Related Art

Virtual Reality (VR) is a computer-simulated environment, whether that environment is a simulation of the real world or an imaginary world, where users can interact with a virtual environment or virtual artifact either through the use of standard input devices or specialized multidirectional devices. The simulated environment can be similar to the real world, for example, simulations for flight and racing conditions, or it can differ significantly from reality, as in VR games. Virtual reality is often used to describe a wide variety of applications commonly associated with its immersive, highly visual three-dimensional (3D) environments. The development of Computer Aided Design (CAD) software, graphics hardware acceleration, head mounted displays, database gloves, and miniaturization have helped popularize the notion.

Artificial Intelligence (AI) is a series of algorithms that perform tasks in a similar way a human would without any interaction from a real human factor besides feedback. These algorithms although limited to one specific functionality, can even outperform humans and adapt to new conditions faster in any real or virtual environment.

Portable Device is a generic name that encapsulates general purpose devices that can be wearable such as smart watches and the ones can be carried comfortably by the user like smart phones, tablets and mp4 players with Android or iOS systems, and dedicated devices. The portable devices mentioned contain three accelerometers and a three dimensional gyroscope for motion controls. Head facing cameras in these devices are optional but covered as well.

SUMMARY OF THE INVENTION

The present invention is directed to a system for detecting motion of a portable device and the interpretation of the motion for use in controlling 3D virtual objects within a 3D virtual world as generally used within games. The motions which are interpreted are swinging, panning and moving. Gestures which are triggered to perform specific in game actions are also included. This is accomplished through the use of a linear algorithm, a neural network algorithm, a fuzzy logic algorithm, and a face tracking algorithm. The calibration and transmission of these interpreted motions to another portable device is also provided.

Embodiments of the preset Invention provide methods for controlling virtual objects using a mobile phone device that contains at least accelerometers, gyroscope, CPU and data storage device. The methods described herein detect specific movements of the device by a user's motion of the device. These movements are interpreted by algorithms which are described in these methods. The algorithms which detect the motion of the device are separated into hitting motions, panning motions and gesture motions. These enable the user to perform operations such as throw and catch, throw and hit and hit and hit of an object such as a ball. The following general algorithms are utilized and adapted into the specific methods and algorithms used for the above stated purposes. These generic algorithms are the linear method, neural network method, fuzzy logic method, facial methods (face tracking, face calibration, and face transmission to a game object such as a paddle or glove or other game object) and video camera tracking method. Finally, this patent describes a method for connecting 2 or more of the 3D worlds together and the method of calibrating the mutually shared game experience. This enables interaction within a shared 3D world to occur and allows the same experiences to be transmitted to all participators without the need for the participators to be positioned in the same way.

Three hardware devices that are used for the hit detection defined in these methods are accelerometers, gyroscopes and a front-facing camera.

The methods describe the use of the movements of an user to position a game object within a 3D world. The game object may be a camera, or a paddle or the camera and the paddle. Some of the methods describe ways of advanced control of virtual objects in the 3D world using a real, common portable device that exists in the market and performing actual movements with said device. The primary purpose of connecting a game object such as a paddle to the user is to allow the user to interact within the 3D world as though playing racket sports which require hitting or throwing and/or catching of a ball. Thus particular emphasis and focus is employed in the algorithm for detecting a user's hitting motion and applying this motion within the 3D world to enable the user to experience hitting a ball in the 3D world with their device. The methods described herein for determining the hitting motion from the users movements have been designed according to the following 5 algorithms: linear, neural, fuzzy, face referencing, and camera referencing. (Illustration of movement made by a user moving a device being reflected in the virtual world's as a paddle with the camera following it).

BRIEF DESCRIPTION OF THE DRAWINGS

The inventions may be best understood by reference to the following description taken in conjunction with the accompanying drawings in which:

FIG. 2 Illustrates the representation of the real world device with a virtual object that can either be seen by the game camera or be the game camera itself.

FIG. 10 Illustrates a way to change the rotational effects of the game world by changing the pivot point to any desired location related to the game object to be controlled.

FIG. 11 Illustrates how the local motion coordinates change depending of the orientation of the portable device and it can be detected and used with different methods.

DETAILED DESCRIPTION

The following embodiments describe methods and computer programs for existing portable devices that provide ways to detect motions caused by a user and interpret them to control virtual objects in a game scene in a way that detects a human natural movement. The methods contain programs that offer a different approach to obtain similar results but are independent of one another, this means that any method or program can be used and it will depend on the scope of the application or game that a program will be best suited for. The hardware of technology present in the current portable devices have not been described in detail due to general knowledge of them and to not obscure the present invention.

Figure 1:
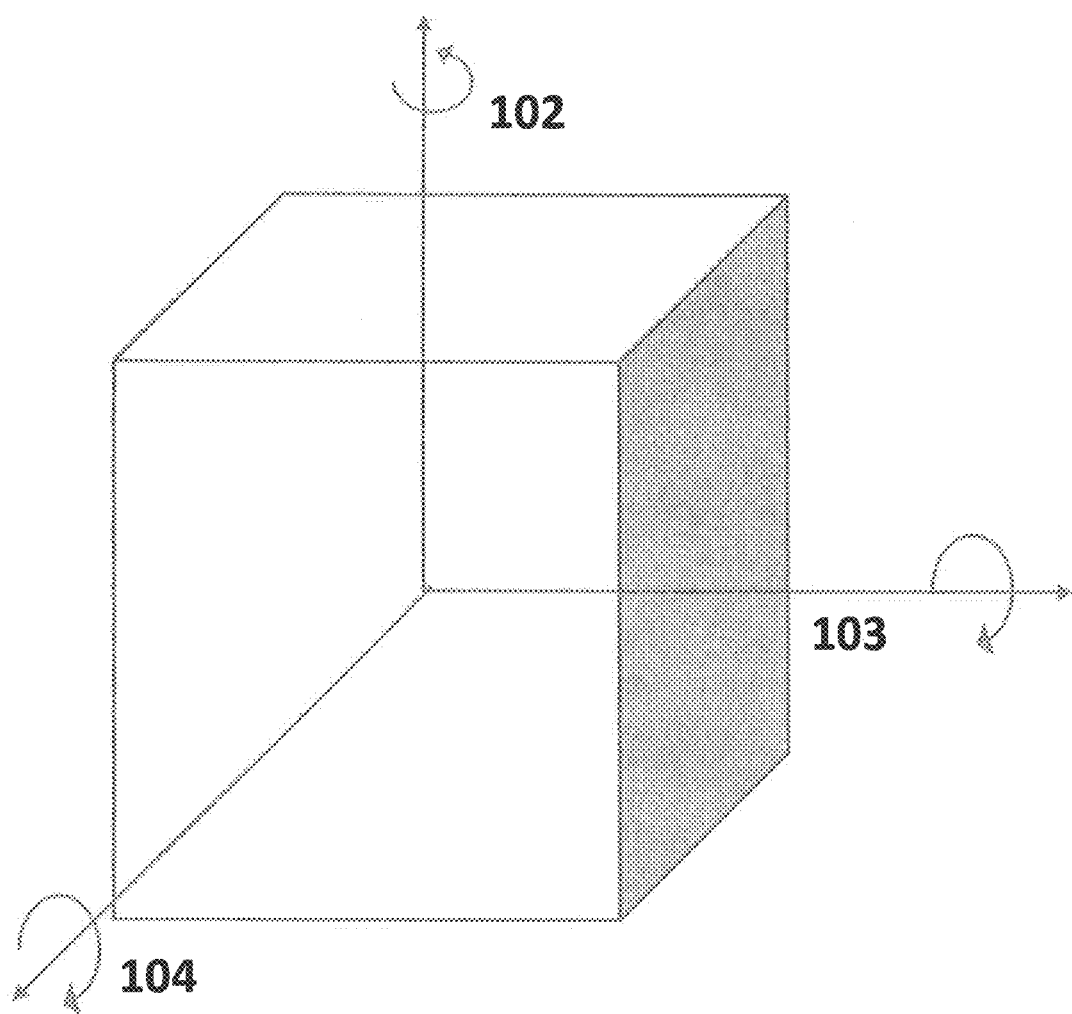
FIG. 1 Describes a common knowledge of the three linear and rotational axes present in any common portable device that exists in the market.

FIG. 1 Describes a common knowledge of the three linear and rotational axes present in any common portable device that exists in the market. These axes are y or yaw 102, x or pitch 103 and z or roll 104 axes for linear or rotational movement respectively.

FIG. 2 Illustrates the representation of the portable device shown as 202 with a virtual object that can either be seen by the game camera like in 203 or be the game camera itself as in 204. The invention allows to adapt to any app design situation and fit development needs for motion controlled object in the virtual world. Any change in the device's orientation will be represented in the virtual work and any changes in position of rotation can be used to provide more inputs than what a touch screen can provide for natural use.

Figure 3:
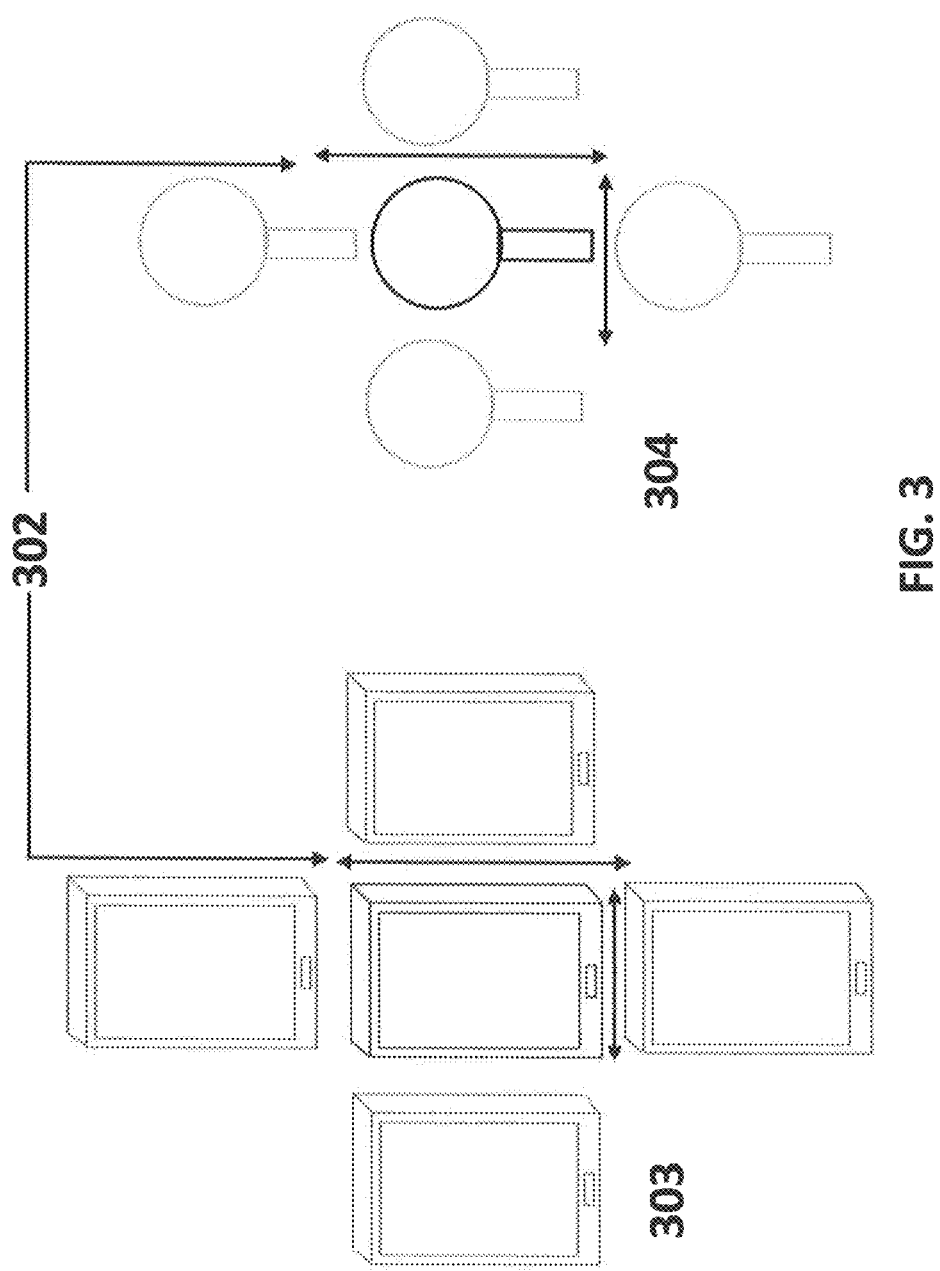
FIG. 3 Illustrates how the linear movement of the portable device will be reflected on the game object in the 3D world using different methods that will be described later.

FIG. 3 302 shows a typical example of changes in position of the portable device like in 303 made by the user and these changes are reflected on the virtual object 304 that will move in the corresponding axis. It does not detect the position, but changes that are easily found thanks to the information provided by the accelerometers and gyroscope and interpreted by the computer program. The changes in position are not only used to move objects in the 3D space but also to detect a motions such as hits with a paddle, racket or bat and calculate a force value in any of the axes. The programs that perform these tasks can be AI algorithms like fuzzy logic and neural networks for precision, head tracking algorithms that use the player's head as reference point to perform movements in the 3D space where precision is a must but not performance in the simulation, or simple linear calculations for quicker performance at expenses of accuracy. It depends on the application or game design requirements which one will be best used.

Figure 4:
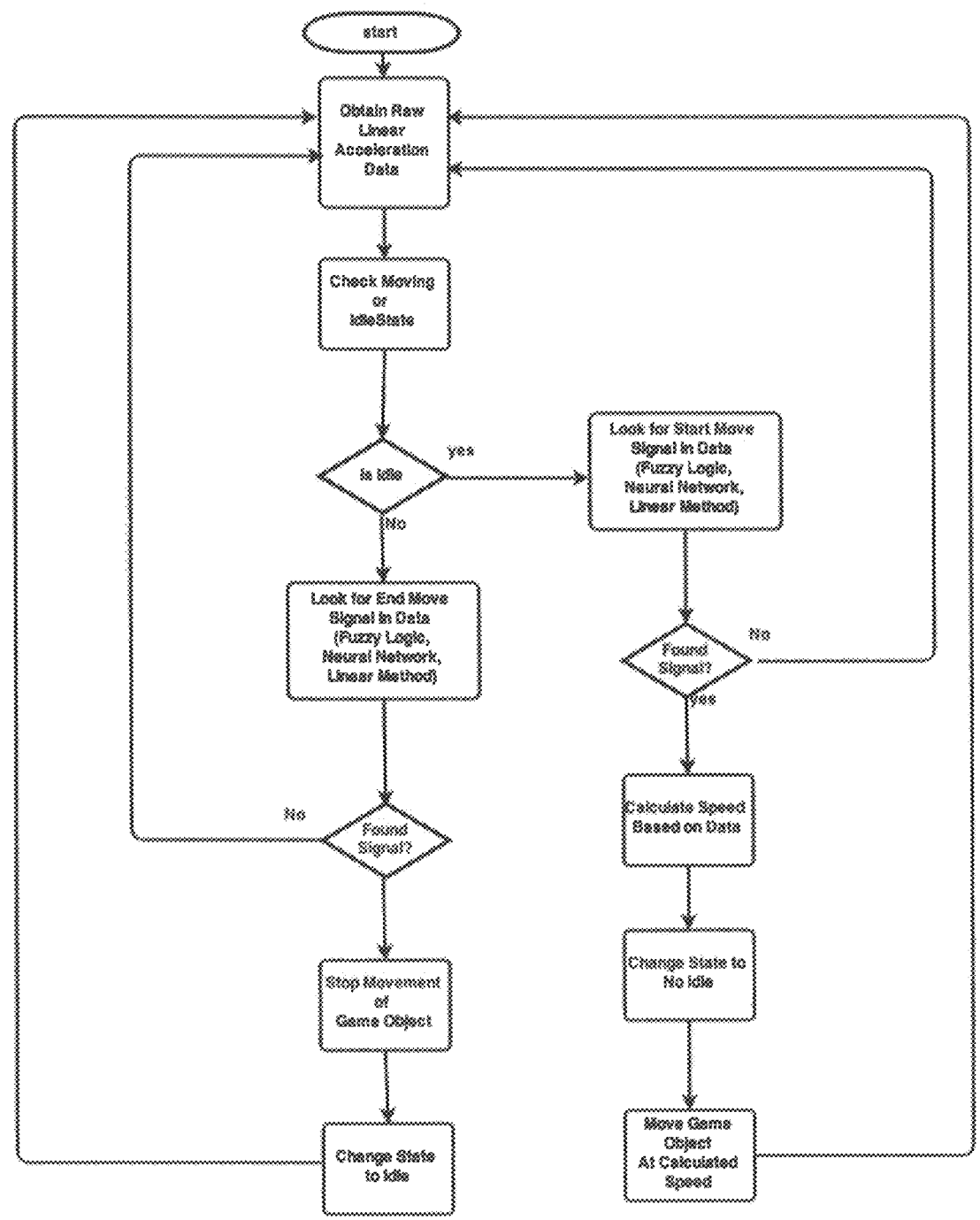
FIG. 4 Shows the flowchart of the process of using the linear acceleration data to detect the start or end of a linear movement in the virtual world.

FIG. 4 Illustrates the process in which the linear accelerations is processed by computer programs to detect the start and end motions in the captured raw data. When the device is not moving at the beginning, it will wait for a start signal in the captured data using either linear calculations, fuzzy logic or neural networks and if so, it will calculate the speed in which the game camera or object will move and will remain in that state until a stop signal is detected using the same computer programs.

A class defined as Capturer.cs (a C#script) takes care of the capturing of the accelerometer, gyroscope and face tracking (if supported on device) data where and puts it in a structure like the following:

```
public sctructure AccelerometerData
{
    public float timeframe;
    public Vector3 rawDataValue;
    . . .
}
```

This data structure will allow the algorithm to see the changes of the captured data over time for detection of any motion that is desired to detect, including the hit detection. Every time the data is captured it is stored in a collection that is accessed by the evaluation code.

```
public List<AccelerometerData> rawGyroAccelData =
    new List<AccelerometerData>( );
public List<AccelerometerData> rawGyroRotData =
    new List<AccelerometerData>( );
public List<AccelerometerData> rawHeadTrackDataPos =
    new List<AccelerometerData>( );
public List<AccelerometerData> rawHeadTrackDataRot =
    new List<AccelerometerData>( );
```

The list rawGyroRotDato is created to store the value of the rotation rate of the device (similar to degrees per second but not really accurate units—[because it is storing the items as the game engine retrieves the raw data and this data is not consistent thus we must processes this data based upon the devices processing power and record the time unit, then when applying the algorithm upon the data the time metric defines the degree of accuracy]) and rawGyroAccelData is to store the linear acceleration data (similar to meters per second squared but again, not really accurate units).

The Capturer Class, after obtaining the accelerometer data, stores it in the first element of the rawGyroAccelData list. This way the most recent data is always on the first elements of the list.

```
rawGyroAccelData.Insert(new AccelerometerData(0, currentTime,
    Input.gyro.userAcceleration));
rawGyroRotData .Insert(new AccelerometerData(0, currentTime,
    Input.gyro.rotationRateUnbiased));
rawHeadTrackDataPos.Insert(new AccelerometerData(0, currentTime,
    HeadTracker.position));
rawHeadTrackRot.Insert(new AccelerometerData(0, currentTime,
    HeadTracker.rotation));
```

On the snippet above, currentTime is the time the data has been captured and Input.gyro.userAcceleration along with Input.gyro.rotationRateUnbiased, HeadTracker.position and HeadTracker.rotation corresponds to the linear acceleration date, rotation, and head tracking data respectively detected at that time. To avoid memory blowout, a number of sample's parameters are defined so that when the lists achieve the full capacity determined by such parameter, it will discard the last element of the list when a new element is inserted at the beginning to keep the memory use constant. There is also another parameter, a sampling time, in which each data is stored after a certain time has passed (from millisecond to seconds depending on the requirements of the game). This is similar to a buffer of data.

For the linear movements, it is necessary to have at least two values to compare, but three are recommended in order to detect a peak or valley value that will determine the direction and speed of the virtual object to move and even a force value if the data is used to detect a hit motion for a paddle, racket or bat.

The code for detecting a linear motion and stopping it can go as follows.

```
Vector3 data1;
Vector3 data2;
Vector3 data3;
Vector3 isMovingVector;
float moveSpeed;
...
data1 = Capturer.rawGyroAccelData [0].rawDataValue;
data2 = Capturer.rawGyroAccelData [1].rawDataValue;
data3 = Capturer.rawGyroAccelData [2].rawDataValue;
...
transform.position = transform.position + (isMovingVector * moveSpeed);
if(isMovingVector.x == 0) // process movement in x axis
{
  if(data2.x > data1.x && data2.x > data3.x) //peak
  {
    isMovingVector.x = -Mathf.Clamp(data2.x, -1f, 1f,; //
    Movement in opposite direction
  }
  else if(data2.x < data1.x && data2.x < data3.x) //valley
  {
    isMovingVector.x = Mathf.Clamp(data2.x, -1f, 1f); //
    Movement in opposite direction
  }
}
else
{
  If(isMovingVector.x > 0 && data2.x < data1.x && data2.x < data3.x)
  //stop signal
    isMovingVector.x =0;
  If(isMovingVector.x < 0 && data2.x > data1.x && data2.x > data3.x)
  //stop signal
    isMovingVector.x = 0;
}
// Do the same for "y" and "z" axis
```

AI algorithms like Neural Networks and Fuzzy Logic can add a better level of precision using three separate systems (one for each axis) to interpret the motion data by the accelerometers and gyroscopes in linear acceleration. The following algorithm shows how to use Neural Networks and Fuzzy logic to determine the panning movements of the user:

```
Vector3 resultVect;
Vector3 maxValueInputVect;
Vector3 maxValueOutputVect;
Vector3 data1 = Capturer.rawGyroAccelData [0].rawDataValue;
Vector3 data2 = Capturer.rawGyroAccelData [1].rawDataValue;
Vector3 data3 = Capturer.rawGyroAccelData [2].rawDataValue);
if (useNeuralNet)
{
  data1 = (data1 + maxValueInputVect) * (2 * maxValueInput);
  data2 = (data2 + maxValueInputVect) * (2 * maxValueInput);
  data3 = (data3 + maxValueInputVect)* (2 * maxValueInput);
  neuralNetX.evaluate[[data1.x, data2.x, data3.x],
    out resultVect.x);
  neuralNetY.evaluate[[data1.y, data2.y; data3.y],
    out resultVect.y);
  neuralNetZ.evaluate[[data1.z, data2.z, data3.z],
    out resultVect.z);
  resultVect = (resultVect * 2) - maxValueOutputVect;
}
else
{
  resultVect.x = neuralNetX.evaluate(data1.x, data2.x, data3.x);
  resultVect.y = neuralNetY.evaluate(data1.y, data2.y, data3.y;
  resultVect.z = neuralNetZ.evaluate(data1.z, data2.z, data3.z);
}
transform.position = transform.position + (resultVect * moveSpeed);
```

Figure 5:
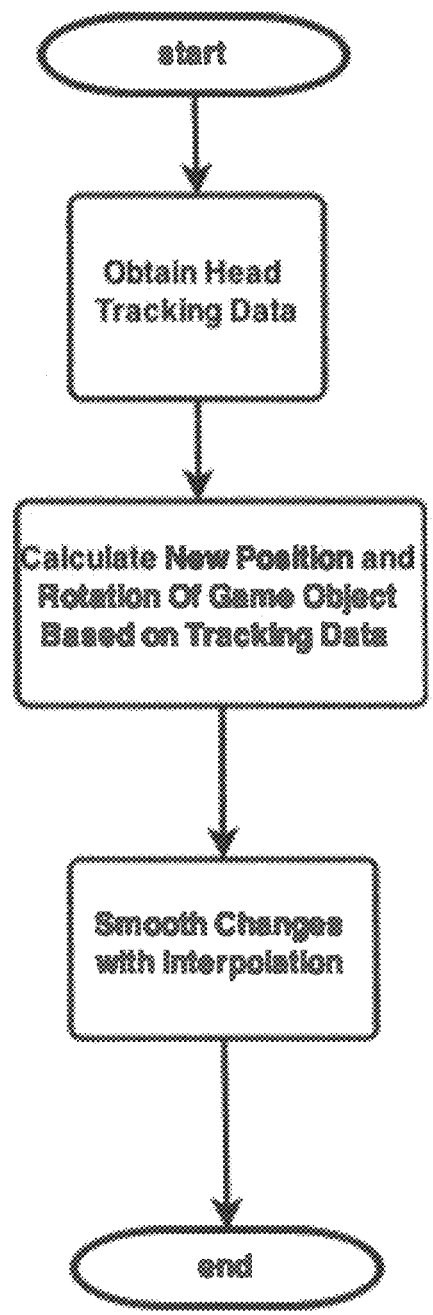
FIG. 5 Contains the flowchart of the use of head tracking data to change position and rotation of game objects or game camera.

FIG. 5 Displays the flow chart of the use of head tracking technology that uses the portable device's front facing camera to change position and rotation based on the location of the user's face.

When head tracking is used as a game controller, it can be straightforward what you can do to pan the virtual paddle in the game world in a code similar to this example:

```
float scaleFactor = 1;
paddleTransform.position = -HeadTracker.newPosition * scaleFactor;
Vector3 localPosition = paddleTransform.localPosition;
localPosition.y = -0.2f; //fixed value;
paddleTransform.localPosition = localPosition;
```

Figure 6:
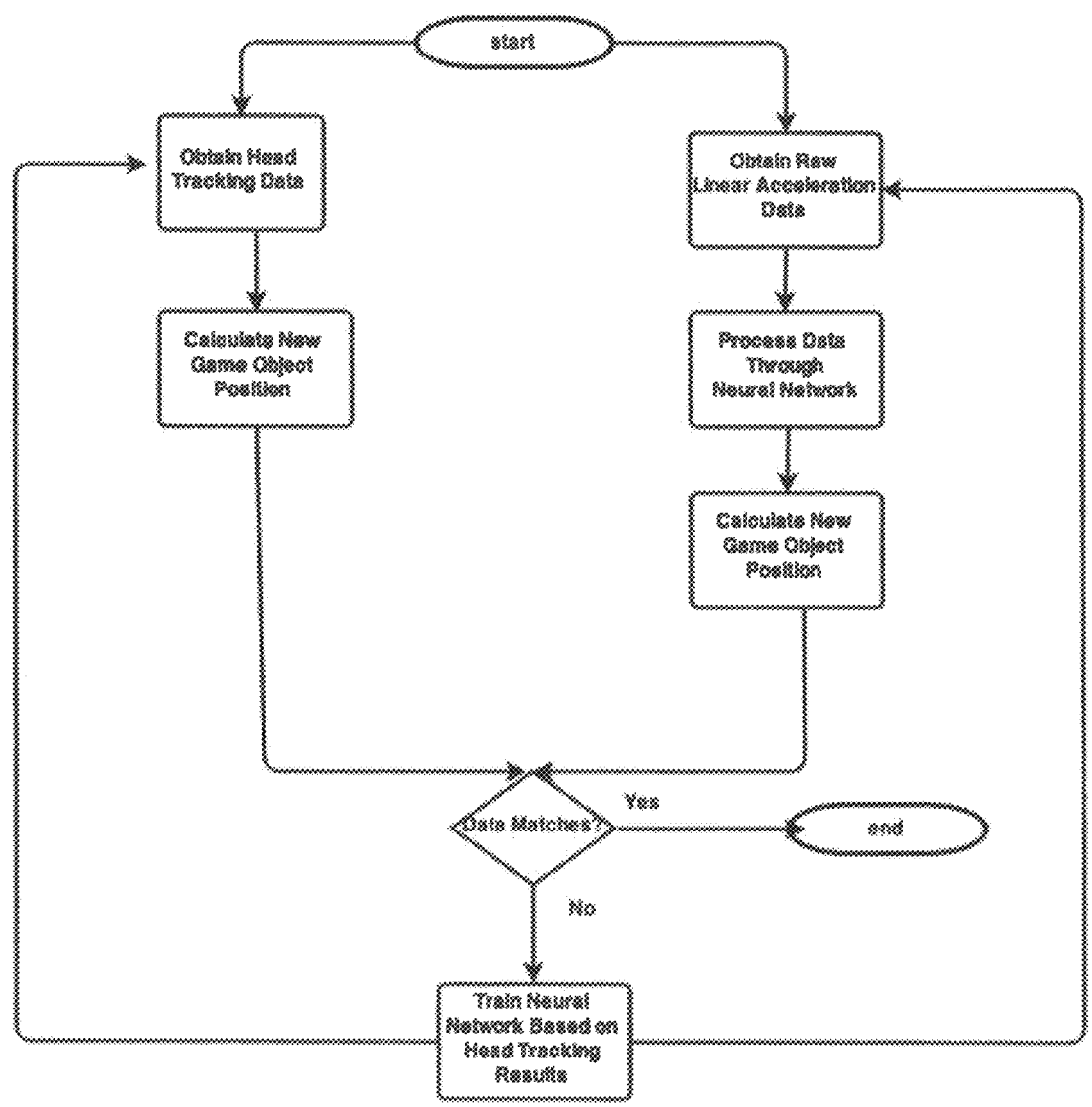
FIG. 6 Shows the flowchart that explains how to use head tracking data to calibrate and train a neural network that users accelerometers.

FIG. 6 Describes how head tracking technology can be used to train and calibrate a neural network that uses the linear acceleration data, since the head tracking processing has performance issues with current technology it can be used as reference for neural networks with valid data

```
Vector3 speedVect = [Capturer.rawHeadTrackDataPos[endFrame].rawDataValue -
    Capturer.rawHeadTrackDataPos[initialFrame].rawDataValue) /
    (Capturer:rawHeadTrackDataPos[endFrame].timeframe-
    Capturer.rawHeadTrackDataPos[initialFrame].timeframe);
Vector3[ ] initialAcceleration = [Capturer.rawHeadTrackDataPos[initialFrame - 1].rawDataValue,
    Capturer.rawHeadTrackDataPos[initialFrame].rawDataValue
    Capturer.rawHeadTrackDataPos[initialFrame + 1].rawDataValue
Vector3[ ] endAcceleration = [Capturer.rawHeadTrackDataPos[endFrame - 1].rawDataValue,
    Capturer.rawHeadTrackDataPos[endFrame].rawDataValue
    Capturer.rawHeadTrackDataPos[endFrame + 1].rawDataValue];
neuralNetX.Train([initialAcceleration[0].x, initialAcceleration[1].x, initialAcceleration[2].x],
    speedVect.x, 1000); //train begin movement
neuralNetX.Train([endAcceleration[0].x, endAcceleration[1].x, endAcceleration[2].x],
    0, 1000); //train end movement
neuralNetY.Train([initialAcceleration[0].y, initialAcceleration[1].y, initialAcceleration[2].y],
    speedVect.y, 1000); //train begin movement
neuralNetY.Train([endAcceleration[0].y, endAcceleration[1].y, endAcceleration[2].y],
    0, 1000); //train end movement
neuralNetZ.Train([initialAcceleration[0].z, initialAcceleration[1].z, initialAcceleration[2].z],
    speedVect.x, 1000); //train begin movement
neuralNetZTrain.([endAcceleration[0].z, endAcceleration[1].z, endAcceleration[2],z],
    0, 1000); //train end movement
```

Figure 7:
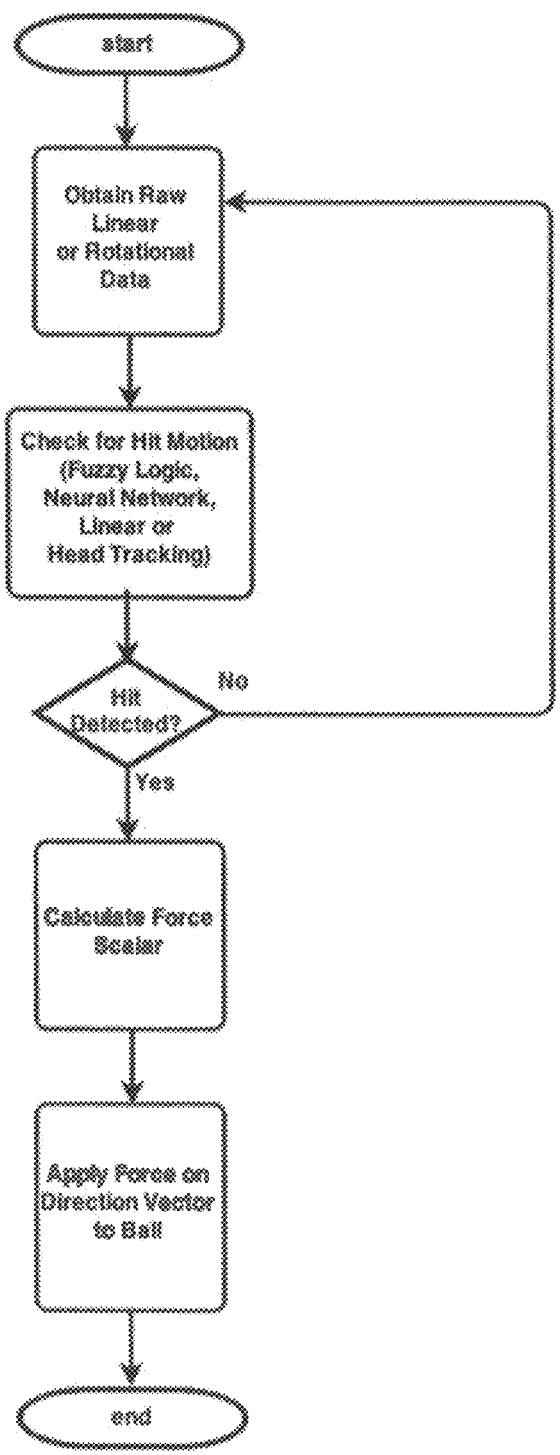
FIG. 7 Explains the process of detecting a hit motion based on linear or rotational changes on a portable device.

FIG. 7 Shows another application of the computer programs to detect hit motions on game object using the game camera as a paddle, by detecting a quick motion in the raw captured data, either linear or rotational, and calculating a force value to be applied in a target game object in the virtual world.

For example, the "flick" movement along the X axis for pitch can be detected as follows:

```
Vector3 acelData1 = Capturer.rawGyroRotData[0].rawDataValue;
Vector3 acelData2 = Capturer.rawGyroRotData[1].rawDataValue;
If(acelData1.x > thresholdX && acelData2.x < -thresholdX)
    PaddleControl.hitForce = force;
```

For a linear hit motion by the user in the Z axis, the code can be as follows:

```
float accelZ1 = Capturer.rawGyroAccelData[0].rawDataValue.z;
float accelZ2 = Capturer.rawGyroAccelData[1].rawDataValue.z;
float accelZ3 = Capturer.rawGyroAccelData[2].rawDataValue.z;
float diff1 = accelZ2 - accelZ1;
float diff2 = accelZ2 - accelZ3;
If(diff1> thresholdZ && diff2 > thresholdZ)
    PaddleControl.hitForce = force;
```

This can also be applied with head tracking replacing the first three lines with:

```
float accelZ1 = Capturer.rawHeadTrackPos[0].rawDataValue.z;
float accelZ2 = Capturer.rawHeadTrackPos[1].rawDataValue.z;
float accelZ3 = Capturer.rawHeadTrackPos[2].rawDataValue.z;
```

For the neural networks, the captured data must be normalized according to the programming conventions of this algorithm before sending it to a neural network component that is either trained or in the training phases and de-normalize the results to be fit to use in controls of the game objects in the 3D world.

The following code snippet illustrates the use when it's a linear hit using variable force. It can also be applied with the head tracking movement data.

```
float accelZ1 = (Capturer.rawGyroAcceldata[0].rawDataValue.z +
    maxValueInput) * (2 * maxValueInput);
float accelZ2 = (Capturer.rawGyroAcceldata[1].rawDataValue.z +
    maxValueInput) * (2 * maxValueInput);
float accelZ3 = (Capturer.rawGyroAcceldata[2].rawDataValue.z +
    maxValueInput) * (2 * maxValueInput);
float result = 0;
neuralNet.evaluate([accelZ1, accelZ2, accelZ3], out result);
result = (result * 2) - maxValueOutput;
PaddleControl.hitForce = result * force;
```

Figure 8:
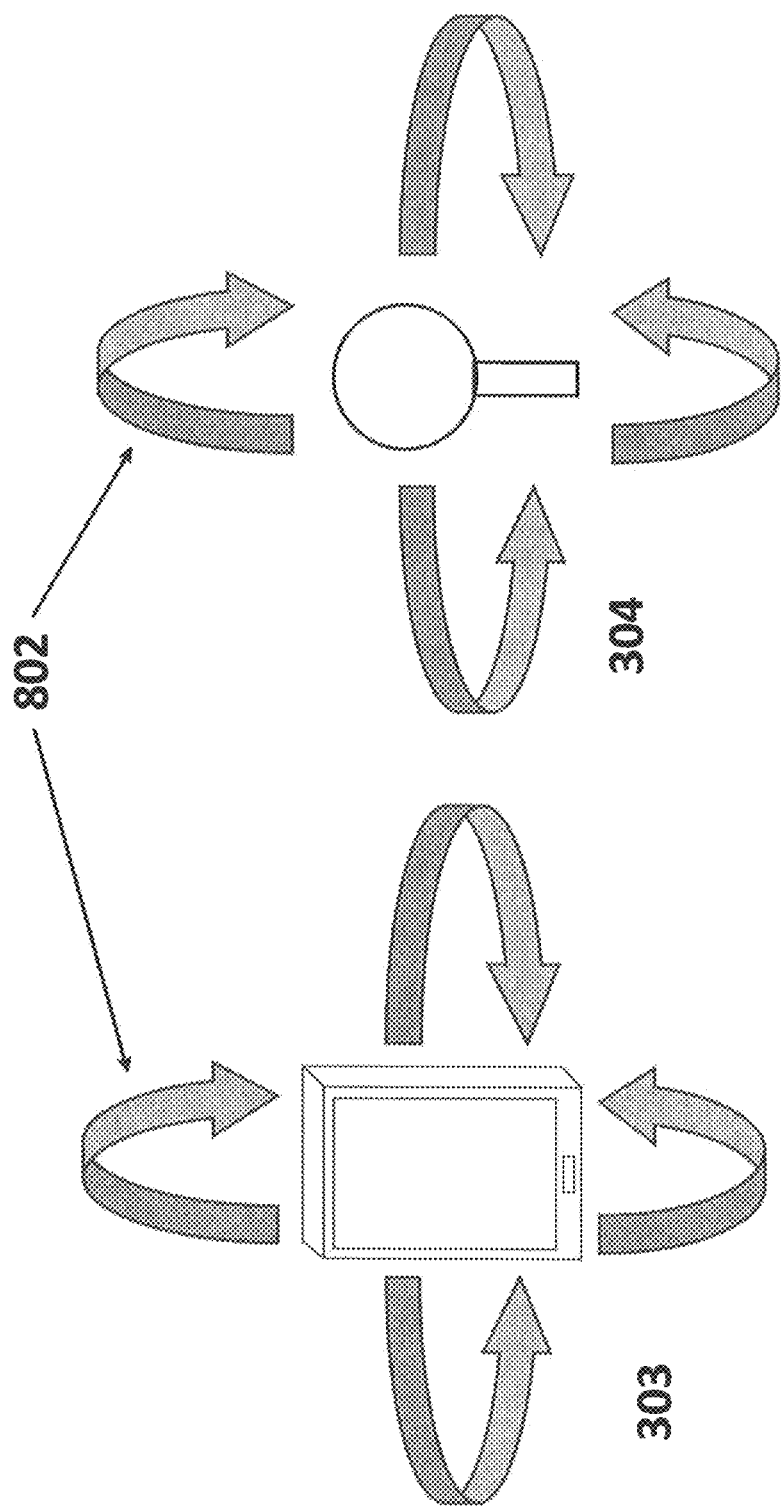
FIG. 8 Illustrates how the rotational movement of the portable device will be reflected on the game object in the 3D world using different methods.

FIG. 8 802 illustrates a case of changes in rotation of 303 and will be reflected on 304 on the corresponding rotation axis by reading data on the gyroscope inside the portable device. While many programs outside this invention already can reflect the orientation of 303 in 304, this invention uses the changes in orientation over a period of time to detect complete motions performed by the user such as flips and spins and even more complex movements like rocking or buoyancy. The algorithms of AI like fuzzy logic or neural networks as well as linear calculations are used for these mentioned motions as well as hit detection based on rotation speed and calculate a force to be applied in a virtual game object like a baseball. Wrist movements are used as base cases for the hit detections.

Figure 9:
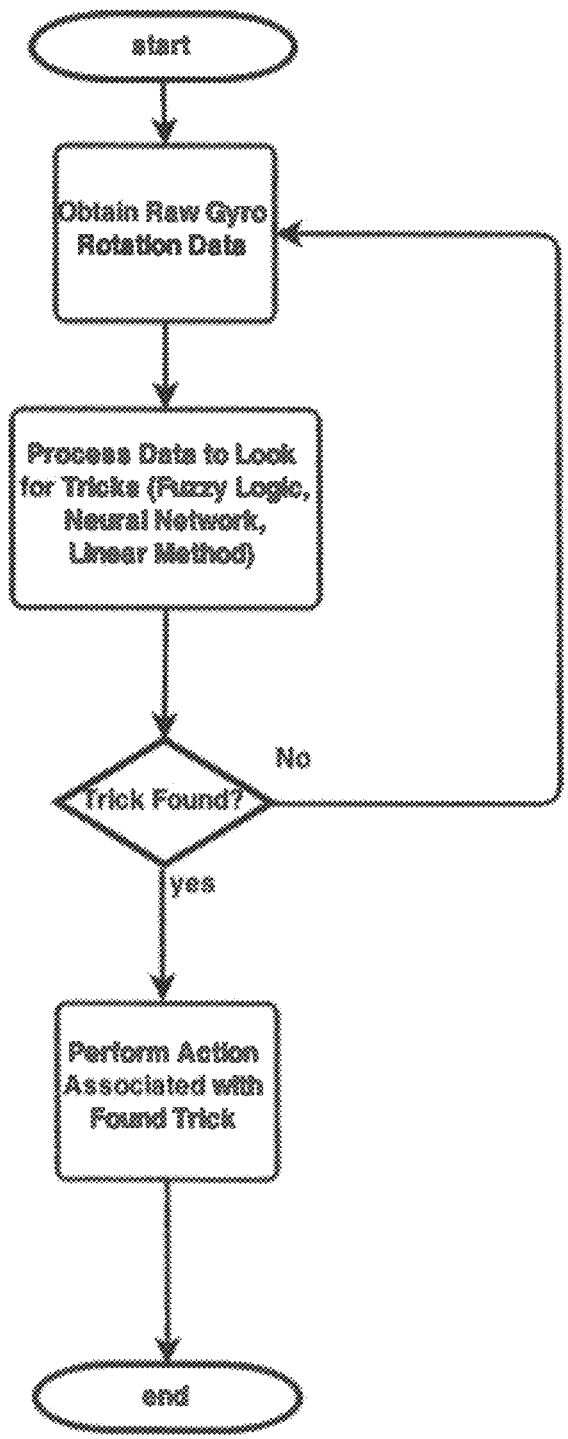
FIG. 9 describes the process of detecting rotation tricks using captured data.

FIG. 9 Shows the flow chart that the computer programs use to detect the rotational tricks performed on the real portable device as shown in FIG. 8.

For the rotation gestures, a similar structure is required to store the data over time:

```
public struct GyroRotationData{
    public Vector3 rotationData;
    public float timeFrame;
}
```

To provide storage of the data, a collection is required.
public
    List<GyroRotationData>gyroRotationDataList=new
    List<GyroRototionData>( );

The linear approach takes a certain number of elements from the gyroRotationData list and evaluates them manually to determine if there has been a gesture. This is done by using predefined parameters that define the necessary conditions for the gesture. For example, to detect a 180 degrees rotation, the evaluation can be used as follows.

```
float angles1 = Capturer.gyroRotationDataList[0]rotationData.x;
float angles2 = Capturer.gyroRotationDataList[1]rotationData.x;
float angles3 = Capturer.gyroRotationDataList[2]rotationData.x;
float diff1 = angles2 - angles1;
float diff2 = angles3 - angles2;
if(diff1 > 88 && diff2 > 88) // use 88 degrees
comparison instead of 90
    return true;
//an 180 degree move has been detected
```

For fuzzy logic and neural network approaches, the same conventions are defined for hit detection because each system uses them. Only the systems themselves are different since their methods are different as well. The following sample code combines both methods separated by an in game parameter that will define which method is used:

```
float angles1 = Capturer.gyroRotationDataList[0].rotationData.x;
float angles2 = Capturer.gyroRotationDataList[1].rotationData.x;
float angles3 = Capturer.gyroRotationDataList[2].rotationData.x;
float diff1 = angles2 - angles1;
float diff2 = angles3 - angles2;
float result = 0;
If(useNeuralNet)
    neuralNet.evaluate([diff1, diff2], out result);
else
    result = fuzzyLogic.evaluate(diff1, diff2);
If(result > 0.5) // half a radian
    //on 180 degree move has been detected
```

Setting up several triggers within a time frame to be triggered in order allows for the interpretation of complex movement by the user. An example of this would be a user twisting a device back and forth like a princess's wand. A gesture set to return true after a device is rotated at least +50 degrees along the up and down axis and then −50 degrees and then +50 degrees and then −50 degrees would then return a true value. If the user triggers a movement along the other axes then this particular gesture recognition pattern would be invalidated. We define a gesture to be composed of 1 or more thresholds which return a true value and a sequence in which the thresholds are performed as well as a set of 0 or more triggers which could invalidate the gesture.

```
public class Gesture{
   List<gestureTrigger> gt;
   int[ ] lastGestureTrue = new int[3];
   float lastGestureTrueTime;
   int i;
   public bool CheckGesture(Vector3[ ] angles, float dataTime){
      for(i = 0; i < 3; i ++){//for each axis
         gestureTrigger gt1 = gt[lastGestureTrue[i]];
         //we have gone past the time threshold for the user to have moved
         from one threshold to the next for this gesture
         //so reset it to start from the beginning of the gesture detection
         sequence of triggers
         //we are within the time so check if it is a gesture
         if(gt1.isGesture(angles, i)){
            lastGestureTrue[i]++;
            //if >= then all triggers have returned true and this gesture has
            been recognized
            if(lastGestureTrue[i] >= gt.Count){
               //its true, reset everything return true
               Reset( );
               return true;
            }
         }
      }
      if((lastGestureTrueTime!=0)&&(datatime − lastGestureTrueTime >
gt1.gestureTimeThreshold)){
         Reset( );
         return false;
      }
   }
   public void Reset( ){
      lastGestureTrue = new int[3] {0, 0, 0};
      lastGestureTrueTime = 0;
   }
}
public class gestureTrigger{
   float[ ] threshHold ;//set the threshold for this trigger for example
         //= {88f, −30f, 45f};
   public float gestureTimeThreshold;
   public bool isGesture(Vector3[ ] angles, int axis){
      float diff1 = angles[1][axis] − angles[0][axis];
      float diff2 = angles[2][axis] − angles[1][axis];
      if(diff1 > threshA && diff2 > threshHold[axis])
         return true;
      return false;
   }
}
```

When 1:1 rotation is not desired, it is useful to scale the rotation rate of the gyrometers or accelerometers to achieve desired results. For example, to rotate the in-game camera 90 degrees by just moving the actual device 45 degrees, just duplicating the rotation rate is needed.

cameraTransform.localEulerAngles.z+=Time.deltaTime
      *Capturer.rowGyroAccelData[0].rawDatoValue.z*
      scale;

FIG. 10 depicts a solution when orientations of the portable device can also be used to set both position and rotation of the virtual game object. 1002 is the classic representation of pivot at the center of the portable device as well as the game object that is changed by the detection algorithms where only the rotation of the virtual game object is changed. However, by creating an empty game object that will perform as the base parent object 1003 and another empty game object that will act as a pivot or center of rotations 1004 in a position away from the center of the device we can change the rotation and position of the game object or game camera 1005 that is not a child of the pivot object 1004 and can be at the same position as 1003 or a separate position for different motion effects that depend more on the game or application design. Also, the pivot object can be at any rotation to add different effects like reverse rotations, or rotate in different axes thanks to the freedom of this simple design.

FIG. 11 illustrates how the local motion coordinates change depending on the orientation of the portable device and it can be detected and used with different methods. By using simple game object hierarchy the movement and rotation axes 1102 change depending of the orientation of the device. This removes the requirement that the user has to be in a specific pose in order to control the virtual objects or the game camera with the portable device.

Figure 12:
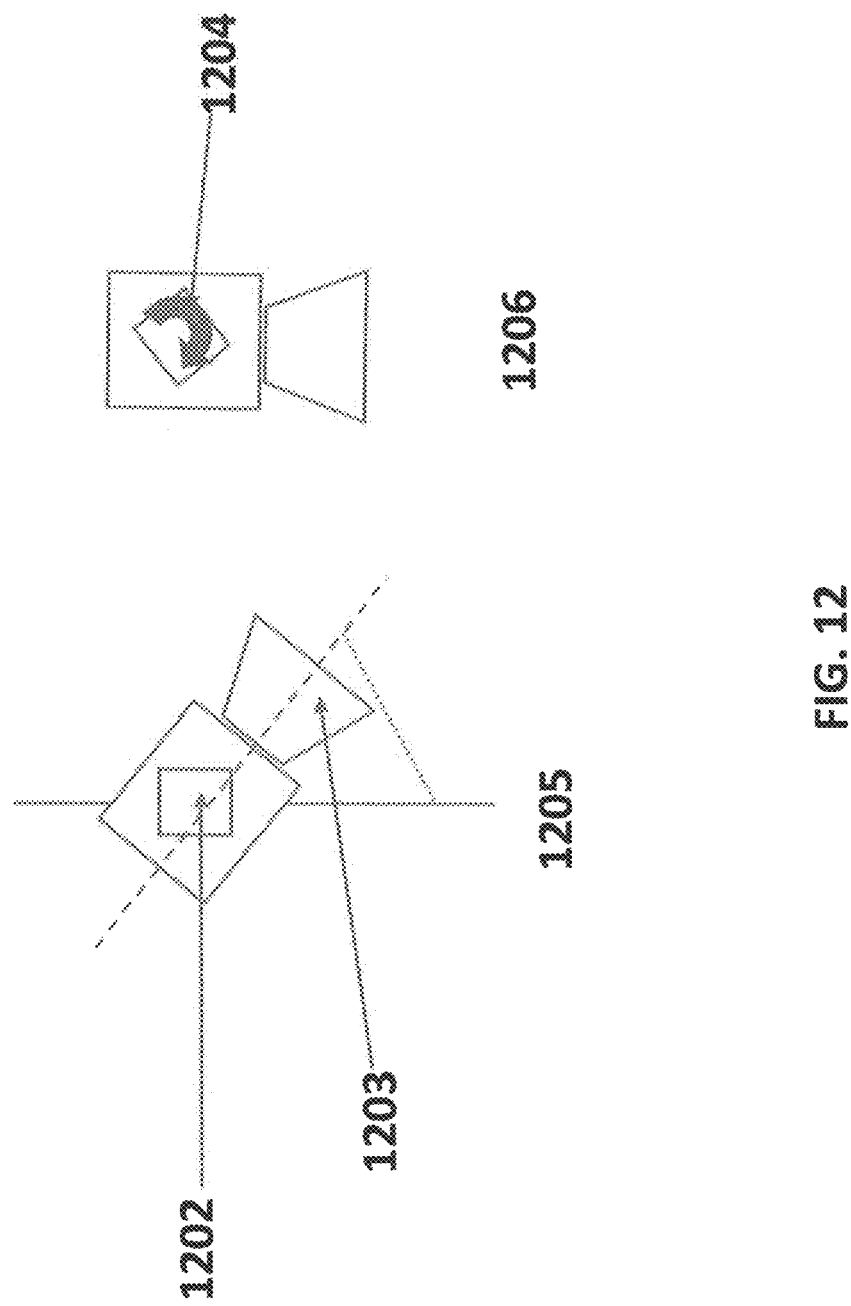
FIG. 12 Illustrates the method of re-centering the game's camera to any orientation the user desires to play while keeping the playing ground ready for actions.

FIG. 12 illustrates a solution for the different ways a user can use the game or application and perform linear or rotational motions to controls the game objects such as a game camera 1203. This is used by having a parent object of the game camera 1202 where the rotation of the device will be transformed to local orientation of the camera. By using an external signal to call the reorientation, the rotation data of 1203 is stored temporarily in an initial state 1205 to then invert and applied to 1202 so that 1203 resets to an initial orientation that the user needs to keep using the game or application in a new state 1206. This allows users to be in any pose as they desire like standing up or laying down and keep playing without interruptions.

The code to re-center a game camera is as follows:

```
private Transform cameraTransform; //The transform of the game camera.
private Transform camParent; //The transform of the camera parent.
. . .
public void Recenter( )
{
   camParent.localRotation = Quaternion.Inverse
      (cameraTransform.localRotation);
}
```

Figure 13:
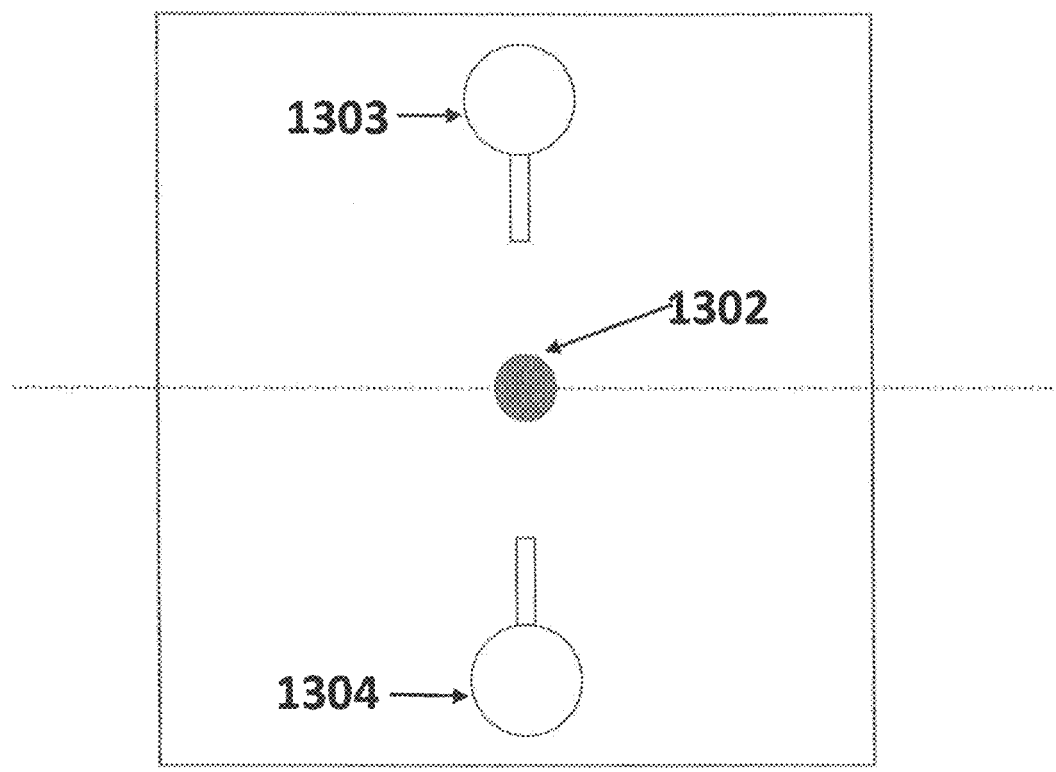
FIG. 13 shows a case of multiplayer game session using a virtual reference point without the need to use a physical reference point to synchronize the data between players like in a game environment such as table tennis.

FIG. 13 Describes a multiplayer session between users where each user sees the game from their perspective and see the opponent on the opposite side like in a table tennis match. In order to accomplish this a center point will act as a mirror reference point 1302 that will be an exact global reference point but rotated 180 degrees. So when a second user connects to the game, his game object 1304 will be the child of 1302 and will control in the exact same way like the first user 1303. The users can be in the same network or in different parts of the world. The center and mirror points will act as virtual references and the only synchronization does not need any real world reference and the re-centering programs will be transparent to each as explained in FIG. 12. To the other player it will appear as they are just in front of them when they can be in any pose in the real world in any network.

The code that allows this accomplishment goes as follows:

```
private Transform cameraTransform; //The transform of the game camera.
private Transform localAuxiliaryTrs; //The transform of the
camera's auxiliary obj.
private Transform otherTransform; //The auxiliary transform
of the opponent's device.
. . .
void Update( )
{
   . . .
   localAuxiliaryTrs.rototion = cameraTransform.rotation;
   SendToNetwork("GetOtherPlayerRotation",
      cameraTransform.localRotation);
}
. . .
public void GetOtherPlayerRotation(Quaternion localRotation)
{
   otherTransform.localRotation = localRotation;
}
```

With the above embodiments in mind. It should be also noted that this invention can also be applied to any device that contains accelerometers and gyroscopes such as dedicated portable devices and peripherals that can interact with such devices. The inventions also work when these portable devices can be used as remote controllers for other devices when the programming allows such behavior.

The invention claimed is:

1. A method of detecting complex linear and rotational movements based on data obtained from a gyroscope sensor and an accelerometer sensor in a portable device by using both linear and artificial intelligence computer programs that are based on sampling data for a period of time and operates on the sampling data for a period of time and operates on the sampling data to perform a desired action in an application or game, wherein the desire action is configured to be a movement or hit detection for an object in the virtual space environment, the method comprising:
  data sampling of accelerometer and gyroscope sensor data in the mobile device with a variable sampling rate and a time frame and storing the data sampling in a defined set for use by the application or game;
  using a linear calculation method to detect peak or valley values of linear motions to detect start and end of movement in any axis without a need to detect an actual position of the mobile device in a real world space;
  using a fuzzy logic method to detect movements and hit motions based on a set of predefined rules that vary depending on the type and scope of the application or game;
  using the data sampling as a whole and filtering noise data out of the data sampling that affects the accuracy of the detection that the linear calculation method initially configured as relevant;
  using neural network algorithms that operate on the sampling data and perform a similar detection of motion and hit detection as the fuzzy logic method with a difference being that the neural network algorithms is based on multiple user configurations and testing in both consumer and quality control sides;
  providing a set of parameters for the neural networks in accordance with an age group and application specifications to avoid overlap and optimize performance;
  modifying the set of parameters based on feedback from the application or game or based on feedback from a performance analysis on the application or lame; and
  using head tracking algorithms defined on portable devices that contain a front facing camera to move virtual objects in the virtual space environment and to use the changes in position over time to calculate forces and speed to be applied to game objects in the virtual space environment such as hit detection and movement.

2. The method of using the motions described in claim 1 to detect hits and for catching and throwing actions between users or in single use mode.

3. The method of claim 1 used to detect trick moves such a flips, jumps, and spins.

4. The method of claim 1, further comprising:
  applying a configurable scale ratio and order of real world movements to be reflected on virtual world objects that depend on the scope and design of the application or game by using simple motions performed on the portable device such as:
  a windshield wiper motion where the game object rotates around a center or pivot object so that it not only changes orientation but also moves in the 3D space and in the real world with just a rotation of the device; and
  reverse or different axis motions by changing which axis of the real world is influenced by a determined axis in the real world to achieve different effects like confusion status in a role playing game or a simpler control of the game object for a specific application.

5. The method of claim 1, wherein the object in the virtual space environment is configured to re-center to an original state or zero orientation of the x, y, z angles in the virtual space environment when the mobile device changes a position in the real world such that the game or application is configured to keep playing by using a parent object that inverts the rotation that represents the orientation of the mobile device, thus allows the object in the virtual space environment or front facing camera to return to the original state without pausing or restarting the application or game.

6. The method of claim 1 is further configured to allow a multiplayer session while keeping the controls of the single player mode by creating virtual reference points that are located in the exact position as the reference point in single player mode but with a different rotation so the virtual reference points able to become a reference point for other users which enables all of the players in the virtual world to see the virtual object being moved and rotated by the portable device and is consistent with the original players portable devices movement and orientation with respect to that players calibrated orientation.

7. The method of claim 6, wherein a transmitting local position and rotation that other players use is doe by the application or game while not affecting the changes of the virtual space environment in the multiplayer session.

8. The method of claim 1 applying the utilization of the data previously derived to a virtual object through mapping each axis of the rotation and acceleration of the mobile device independently from the world space of the mobile device to the virtual space environment and wherein the mapping makes the mobile device and acceleration in any plane effect the rotation and/or translation of the object in a virtual space environment in any plane, and wherein the mapping includes mapping the rotation and acceleration of the mobile device to the rotation and acceleration of the object in a virtual space environment independently and combinable in any sequence.

* * * * *